United States Patent [19]

Thiac

[11] 4,056,380

[45] Nov. 1, 1977

[54] METHOD OF PRODUCING AN ORGANIC SOIL ADDITIVE AND THE PRODUCT THEREOF

[75] Inventor: E. Brandt Thiac, Lafayette, La.

[73] Assignee: The Hydro-Terre Corporation, Lafayette, La.

[21] Appl. No.: 696,790

[22] Filed: June 25, 1976

[51] Int. Cl.$^2$ ............................................. C05F 11/08
[52] U.S. Cl. ............................................ 71/9; 71/12; 71/23; 71/64 SC
[58] Field of Search ..................... 71/1, 8, 9, 11, 12, 71/21, 23, 64 SC

[56] References Cited

U.S. PATENT DOCUMENTS

| 1,029,378 | 6/1912 | Lawton | 71/12 |
| 1,260,103 | 3/1918 | Wallace et al. | 71/23 X |
| 3,953,191 | 4/1976 | Barton | 71/11 X |

Primary Examiner—Frank A. Spear, Jr.
Assistant Examiner—Ferris H. Lander
Attorney, Agent, or Firm—Wilkinson, Mawhinney & Theibault

[57] ABSTRACT

The present disclosure is directed to a method of producing an organic soil additive from shreaded water hyacinths and a mixture of secondary sewage combined in spaced apart heaps for aeriation and composting with subsequent steam treatment to produce a product having high moisture retention characteristics for use as a soil additive, conditioner, amendment, fertilizer ingredient and/or agent or potting soil.

12 Claims, No Drawings

METHOD OF PRODUCING AN ORGANIC SOIL ADDITIVE AND THE PRODUCT THEREOF

An object of the present invention is to produce a soil additive which has a high water retention characteristic and which greatly enhances the water storing capacity of a soil. Water is metered into the soil as it is needed by the product.

A further object of the present invention is to produce a soil additive which introduces or returns organic matter to the soil which feeds the bacteria to form humas as well as to slowly release the minerals needed for plant growth and development.

A still further object of the present invention is to make a practical utilization of water hyacinths which are a very expensive nuisance in that they are extremely costly and difficult to control and are a menace to navigation and marine life on the one hand and to effectively find a practical use for the extremely difficult to dispose of secondary sewage which contaminates our rivers and streams when municipalities dump what they cannot process.

In accordance with the method of the present invention water hyacinths are first harvested and shreaded.

The secondary sewage sludge in a semi-solid stage containing about 50% water is brought in either by barge or tank trucks, and is mixed into the shreaded water hyacinths which are then piled into heaps. The sewage sludge promotes and accelerates the composting of the hyacinths. The heaps can be either turned manually, mechanically or air can be injected into the heaps to promote decomposition.

The air injection into the heaps and the addition of sewage sludge reduces the composting time from six (6) months to about forty-five (45) days.

The ratio of secondary sewage sludge to water hyacinths which I have found to yield the best organic soil additive is 10–25% of secondary sewage sludge to 75–90% of shreaded water hyacinths mixed together in a pile 10 feet high by 20 feet wide and 100 feet long. The percentages of mixture of secondary sludge to shreaded water hyacinths will vary due to atmospheric conditions in particular temperature. The higher the temperature the less secondary sewage sludge is needed.

The heaps are turned every 7 days or air injected every 7 days.

After composting is completed, the product is steam treated by placing the product on a conveyor which passes through a steam chamber. This operation is necessary to sterilize the finished product. The product remains on the conveyor and when soil conditions and crops necessitate further treatment it is passed through another chamber and further treated with methyl bromide. The operations described in this paragraph are done just prior to shipment and/or packaging.

The primary usage of the product of my method lies in areas that have semi-arid and arid sandy soils with little annular rainfall. Good top soil should contain between 2–4% organic matter. Based on the weight of top soil, between 20 ∝ 40 tons of my product are needed per acre. The reason for the variance is that all soils differ and after analyzing the soil and determining what crop will be grown, the mineral content of the finished product will have to be adjusted. The product of my method is also a valuable ingredient in potting soil mixtures.

Soils of this nature would greatly benefit from this material because of its water retention characteristic, as well as becoming more fertile since this material contains many essential nutrients required for plant growth. Furthermore, the subsequent humus formed after the addition of the compost would increase the nutrient holding capacity and cation exchange capacity of the more sandy soils making them more productive.

The product of our method builds up the organic matter in the soil and greatly reduces the amount of expensive fertilizers needed and supplemental irrigation requirements.

The excellent water retaining ability of the product suggests its value for conserving irrigation water and dissolved nutrients in soils with rapid internal drainage.

A labratory investigation reveals the following findings about the product of my method:

Product: HYDRO-TERRE

Chemical Composition:

Composition has been somewhat variable among batches presumably due to location from which major ingredients obtained.

Approximate composition is as follows:
Dry matter -
  fresh product - 5.9%
  finished product - 12.6%
Chemical elements (on dry matter basis)
  N - 3.0%
  P - 0.5% – 4%
  K - 2.6% – 4.5%
  Ca - 1.0%
  Mg - 1.1%

Water Retention: Excellent

| Product | Percent Water Retained (of added water) |
|---|---|
| 100% Dry sand | 38% |
| 80% Sand, 20% H-t | 80% |
| 100% H-t (dehydrated) | 328% |
| 100% H-t (air dry) | 132% |

Germination Study:

| Product | Test Seed | Results |
|---|---|---|
| 100% H-t | corn | excellent germination |
| 10% H-t, 90% sand | rye grass | excellent germination |
| 20% H-t, 80% sand | rye grass | excellent germination |

Survival of Germinated Seed Without Additional Water

| Product | Condition of seedlings after germination | | |
|---|---|---|---|
|  | 1 Week | 2 Weeks | 3 Weeks |
| 100% Sand | browning | browning | dead |
| 90% Sand, 10% H-t | green | green | browning |
| 80% Sand, 20% H-t | green | green | green |

What I claim is:

1. The method of producing an organic soil additive for improving structural properties of soils comprising:
   a. harvesting water hyacinths,
   b. mixing secondary sewage sludge, animal or poultry manure and/or any combination of the three with water hyacinths in spaced apart heaps,
   c. injecting air into the heaps to cut composting time, and
   d. steam treating the composted mass to sterilize it.

2. The method of claim 1 further comprising the steps of injecting air into the spaced apart heaps.

3. The method of claim 2 further comprising the step of spraying the composted mass with methyl bromide, a soil sterilant, after steam treating, or in place of steam treating.

4. The method of claim 2 further comprising the step of passing the finished product through a micro-wave chamber, either in bulk or packaged as for potting soil.

5. The method of claim 1 wherein the spaced apart heap ratio of water hyacinths to secondary sludge is 75-90% water hyacinths and 10-25% secondary sewage sludge.

6. The method of claim 4 wherein the air injection takes plce for 2 hours every 7 days.

7. The method of claim 1 wherein the water hyacinths are shreaded prior to mixing with secondary sewage.

8. The method of claim 1 wherein the mass is steam treated while on a conveyor passing through a steam chest.

9. The product of the method of claim 1.

10. The product of the method of claim 4.

11. The product of the method of claim 5.

12. The product of the method of claim 7.

* * * * *